United States Patent [19]

Alley

[11] 3,918,724

[45] Nov. 11, 1975

[54] SEAL FOR REPAIR OF A SHAFT OR THE LIKE

[76] Inventor: David W. Alley, 5917 Harbrook, Houston, Tex. 77017

[22] Filed: Nov. 28, 1973

[21] Appl. No.: 419,652

[52] U.S. Cl. ........................ 277/9; 277/84; 277/37
[51] Int. Cl.² .......................................... F16J 9/00
[58] Field of Search ............ 277/9, 35, 37, 41, 224, 277/87, 58, 84

[56] References Cited
UNITED STATES PATENTS

| | | | |
|---|---|---|---|
| 3,152,808 | 10/1964 | Tankus et al. | 277/87 X |
| 3,207,521 | 9/1965 | Dega | 277/58 X |
| 3,408,084 | 10/1968 | Huling | 277/37 |

FOREIGN PATENTS OR APPLICATIONS

| | | | |
|---|---|---|---|
| 781,958 | 8/1957 | United Kingdom | 277/224 |
| 1,471,954 | 1/1967 | France | 277/37 |

Primary Examiner—Samuel B. Rothberg
Attorney, Agent, or Firm—Pravel & Wilson

[57] ABSTRACT

A seal formed of a fluoroethylene polymer or like sealing material which is adapted to be disposed between two surfaces, usually a shaft surface and a mechanical seal, for sealing therewith and which has an insert of steel or like material embedded within the sealing material for preventing extrusion of the sealing material when it is confined between the two surfaces to be sealed, the preferred form of such seal being suitable for mounting with a shaft to repair a surface of the shaft which has become worn, corroded or otherwise unsuitable for providing a sealing surface with a mechanical seal.

6 Claims, 3 Drawing Figures

SEAL FOR REPAIR OF A SHAFT OR THE LIKE

BACKGROUND OF THE INVENTION

The field of this invention is repair devices for a shaft or the like.

It has been customary for rotating shafts to be sealed with mechanical seals in contact with the surface of the shaft. When the surface of the shaft became worn, corroded, or otherwise unsuitable for sealing with the mechanical seal, the shaft has normally been replaced because the expense of repair has been too great.

SUMMARY OF THE INVENTION

The present invention relates to a repair device or seal which is particularly suitable for mounting on a shaft to engage with a mechanical seal, so that a shaft which has become worn, corroded or otherwise unsuitable for sealing with the mechanical seal can be economically repaired, thereby avoiding the waste of replacement of the entire shaft. In the preferred embodiment, the repair device comprises a sealing layer generally cylindrical and of "Teflon" or the like, which has a press fit on a shaft and which has embedded therein an insert of steel, also generally cylindrical, so that when the repair device is confined between the shaft and a mechanical seal, the sealing layer does not extrude from its sealing contacts. When a shaft is to be repaired, the shaft is machined to a smaller diameter and the repair device of this invention is pressed thereon so as to have a press fit.

DESCRIPTION OF THE PREFERRED EMBODIMENTS

Figure 1:
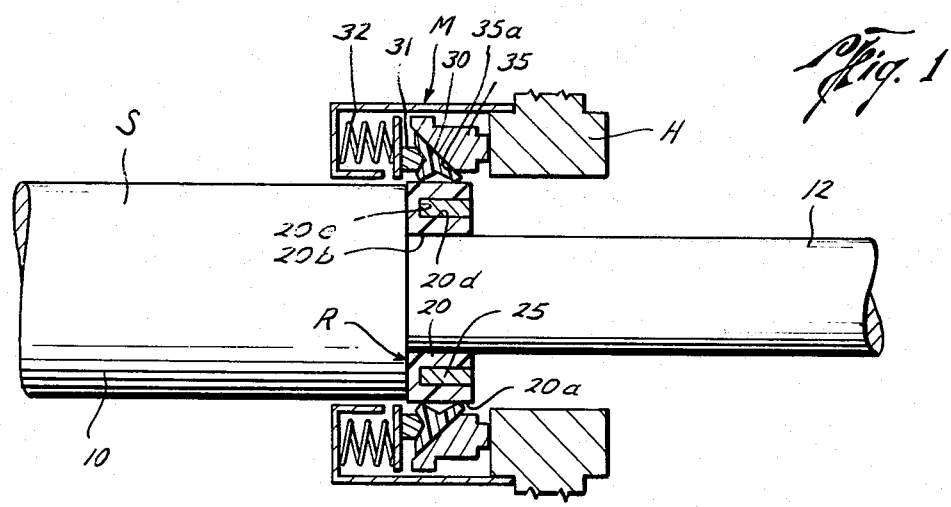
FIG. 1 is a view, partly in elevation and partly in section, illustrating the preferred form of the repair or seal device of this invention in position on a shaft, and sealing with a conventional mechanical seal disposed externally of the shaft.
Figure 2:
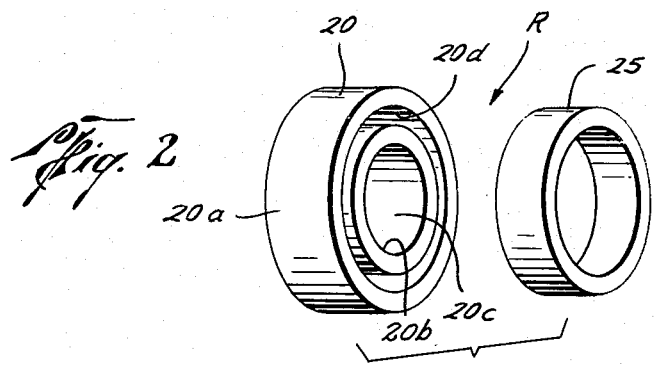
FIG. 2 is an isometric view showing the seal or repair device, separated into its components prior to assembly.

In the drawings, the letter R designates generally the seal or repair device of this invention which is adapted to be used on a shaft S in the preferred form of the invention, preferably in conjunction with a conventional mechanical seal M, partially illustrated in FIG. 1.

As illustrated in FIG. 1, the shaft S has a first portion 10 which has a larger diameter than a second portion 12. In a typical use of the seal or repair device R of this invention, the shaft S will originally have the diameter of the first portion 10 and because of wear, corrosion or other conditions which make it unsuitable for sealing with the mechanical seal M, the shaft S has become unuseable or unsatisfactory for use. Under normal conditions, the shaft S would be discarded and replaced with a new shaft. However, with the present invention, the shaft S is repaired and this is accomplished by machining back a portion of the shaft S to provide the smaller diameter portion or section 12 which is capable of receiving the seal or repair device R. As will be more evident hereinafter, the outer diameter of the repair device R is preferably substantially the same as that of the original diameter of the shaft S, as represented by the shaft portion 10 in FIG. 1.

In the preferred embodiment of this invention, the repair device R is in the form of a cylinder and it is formed in two main pieces, a sealing layer 20 and an insert or solid ring 25.

The sealing layer 20 is formed of a sealing material such as polytetrafluoroethylene sold under the trademark "Teflon", and similar material such as chlorotrifluoroethylene polymer, as well as other fluoroplastics. The cylindrical layer 20 has an external sealing surface 20a and an internal sealing surface 20b. The surface 20b defines an inner bore or central opening 20c through the cylindrical layer 20.

An annular or cylindrical recess 20d is preferably formed as a cavity at an intermediate location of the layer 20 between the outer sealing surface 20a and the inner sealing surface 20b, and preferably such recess 20d terminates at an end wall 20e (FIG. 1).

The insert 25 is made of steel or other comparable material such as other metal alloys of iron, aluminum, copper or magnesium. Such metals are given by way of example only, since the invention is not to be limited thereto.

The insert 25 is made of a size to fit within the recess 20d so as to completely fill such recess 20d. Also, in some instances, the thickness of the recess 20d may be slightly smaller than the thickness of the cylindrical insert 25, in which case the insert 25 is forced or pressed into the recess 20d to cause a pre-expansion radially of the inner and outer portions of the layer 20 to provide a prestress condition therein. In any event, the purpose of the insert 25 is to prevent extrusion of the material of the layer 20 when it is in the sealing positon on the shaft portion 12 and in contact with the mechanical seal M or other comparable surface.

The internal diameter of the surface 20b is slightly smaller than the external diameter of the machined off portion 12 of the shaft S so that the repair device R is forced on to the shaft portion 12 with a press fit. Because of the insert 25, the seal or repair device R is held in the press fit on the shaft portion 12, because the insert 25 confines the portion of the layer 20 radially inwardly thereof in a compressed condition between the insert 25 and the external surface of the shaft 12. Such press fit assures a good and lasting seal between the layer 20 and the external surface of the shaft portion 12.

The mechanical seal M which is illustrated in FIG. 1 is merely exemplary of any mechanical seal normally used with rotating shafts. As shown in FIG. 1, the mechanical seal M is supported in a body or housing H, a portion of which is shown, and which may take any suitable configuration. An annular Teflon ring 30 provides the sealing contact with the outer sealing surface 20a of the seal or repair device R. Such seal ring 30 is urged inwardly towards and maintains contact with the external surface 20a by reason of a pusher member 31 which is urged by a spring 32. The seal ring 30 is urged against an inclined surface 35a of a guide ring 35 of the mechanical seal M. It will be appreciated that the seal ring 30 may be any suitable surface with the housing H and may not even have any urging means such as the spring 32 with it.

Figure 3:
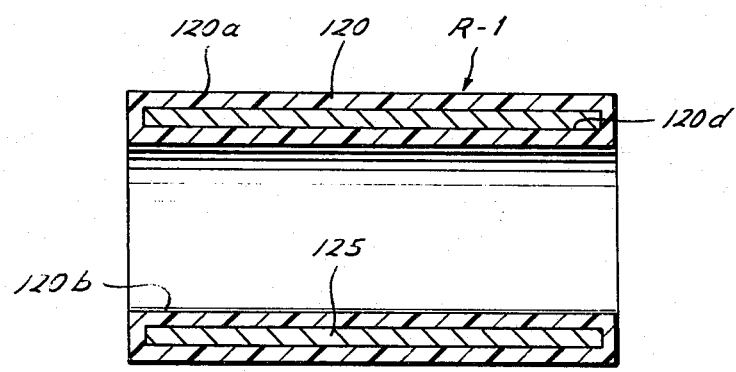
FIG. 3 is a sectional view of a modified form of the repair device or seal of this invention, in the form of a molded assembly.

A modified form R-1 of the repair device is illustrated in FIG. 3. The layer 120 corresponds to the layer 20 and may be formed of any of the materials listed above by way of examples. The insert 125 corresponds with the insert 25 and also may be formed of any of the materials heretofore given with respect to the insert 25 by way of example. The repair device R-1 differs from the repair device R only in that the sealing material forming the cylindrical layer 120 is molded around the insert 125 so that the recess 120d is closed on both ends and the insert 125 is completely confined and surrounded by the sealing material of the layer 120. In such form of the invention, the inner surface 120b is press fitted onto the shaft 12 in the same manner as heretofore described with respect to the surface 20b. Likewise, the external surface 120a forms the outer seal with the mechanical seal M or other suitable conventional sealing means or surface.

Although the invention has been specifically described for an external seal on the external surface of a shaft, the repair device R or R-1 may be disposed internally within a recess adapted to receive it for an internal seal, as will be well understood by those skilled in the art.

The foregoing disclosure and description of the invention are illustrative and explanatory thereof, and various changes in the size, shape, and materials as well as in the details of the illustrated construction may be made without departing from the spirit of the invention.

I claim:

1. A seal device particularly adapted for sealing between a shaft and a mechanical seal wherein the shaft has two longitudinal portions of different outside diameters positioned longitudinally in sequence, with only one end of each portion adjacent to only one end of the other and with a radial shoulder therebetween, comprising:

a cylindrical layer of sealing material having an outer sealing surface adapted to contact said mechanical seal and an inner sealing surface in engagement with a smaller diameter portion of the shaft and a radial sealing surface for engagement with a radial shoulder between the two shaft portions of different outside diameters;

said cylindrical layer having a recess therewith radially outwardly of said inner sealing surface and axially of said radial sealing surface; and a solid continuous ring of steel or the like in said recess and having an inner longitudinal bore surface which is greater in length than the radial thickness of the ring, with said bore surface extending longitudinally and axially substantially concentric with the surface of said smaller diameter portion of the shaft and also coextensively with said layer of sealing material.

2. The structure set forth in claim 1, including:

a shaft having an external smooth continuous cylindrical surface of uniform diameter on the smaller diameter portion of the shaft;

said layer being disposed on said shaft with said inner sealing surface in press fit engagement with said external cylindrical surface of said shaft and with said radial sealing surface in engagement with the radial shoulder between the two shaft portions of different outside diameters; and said ring confining said layer under inward radial compression between said ring and said shaft to effect the seal with said shaft.

3. The structure set forth in claim 1, wherein:

said sealing material is a fluoroethylene polymer.

4. The structure set forth in claim 2, wherein:

said sealing material is a fluoroethylene polymer.

5. The structure set forth in claim 1, wherein:

said recess is a cavity initially formed of a smaller thickness than the thickness of said ring prior to forcing said ring into said cavity; and said sealing material is pre-expanded radially away from said insert by reason of said insert being forced into said recess.

6. The structure set forth in claim 2, wherein:

said recess is a cavity initially formed of a smaller thickness than the thickness of said ring prior to forcing said ring into said cavity; and said sealing material is pre-expanded radially away from said insert by reason of said insert being forced into said recess.

* * * * *